(12) United States Patent
Chen et al.

(10) Patent No.: US 9,753,339 B2
(45) Date of Patent: Sep. 5, 2017

(54) DISPLAY DEVICE AND MANUFACTURING METHOD THEREOF

(71) Applicant: AU Optronics Corp., Hsin-Chu (TW)

(72) Inventors: Chia-Wei Chen, Hsin-Chu (TW); Yu-Sheng Huang, Hsin-Chu (TW); Je-Ruei Jang, Hsin-Chu (TW); Sheng-Miao Huang, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 0 days.

(21) Appl. No.: 14/876,259

(22) Filed: Oct. 6, 2015

(65) Prior Publication Data

US 2017/0003540 A1 Jan. 5, 2017

(30) Foreign Application Priority Data

Jul. 3, 2015 (TW) ............................. 104121735 A

(51) Int. Cl.
*G02F 1/133* (2006.01)
*G02F 1/1345* (2006.01)
(Continued)

(52) U.S. Cl.
CPC ........ *G02F 1/13452* (2013.01); *G02F 1/1336* (2013.01); *G02F 1/1368* (2013.01);
(Continued)

(58) Field of Classification Search
CPC ............. G02F 1/13452; G02F 1/13306; G02F 1/1336; G02B 6/00
See application file for complete search history.

(56) References Cited

U.S. PATENT DOCUMENTS

2002/0163614 A1* 11/2002 Hinata ................. G02F 1/1339
349/139
2009/0302780 A1* 12/2009 Kim ................. G02F 1/133605
315/294

(Continued)

FOREIGN PATENT DOCUMENTS

CN 1979266 A 6/2007
JP 2008/275894 A * 11/2008
(Continued)

OTHER PUBLICATIONS

Taiwan Patent Office "Office Action" issued on Jun. 1, 2016, Taiwan.

(Continued)

*Primary Examiner* — Michael Caley
*Assistant Examiner* — Jonathan Y Jung
(74) *Attorney, Agent, or Firm* — WPAT, PC

(57) ABSTRACT

A display includes a first substrate, a second substrate, a liquid crystal layer, a backlight source, a driving integrated circuit and a conductive portion. The liquid crystal layer is disposed between the first substrate and the second substrate. The backlight source is disposed at a first side of the second substrate. The driving integrated circuit is disposed at a second side, opposite to the first side, of the second substrate. The conductive portion is electrically coupled to the driving integrated circuit and passes through the second substrate to be electrically coupled to the backlight source. Furthermore, a display manufacturing method thereof is also disclosed here.

4 Claims, 10 Drawing Sheets

(51) Int. Cl.
*G02F 1/1335* (2006.01)
*G02F 1/1368* (2006.01)
*G02F 1/1362* (2006.01)
*G02F 1/1333* (2006.01)

(52) U.S. Cl.
CPC .... *G02F 1/13306* (2013.01); *G02F 1/136286* (2013.01); *G02F 2001/133302* (2013.01)

(56) References Cited

U.S. PATENT DOCUMENTS

| | | | | |
|---|---|---|---|---|
| 2010/0302478 | A1* | 12/2010 | Nakagawa | G02B 6/0091 349/62 |
| 2012/0140446 | A1* | 6/2012 | Seetzen | G02F 1/133605 362/97.1 |
| 2014/0049742 | A1* | 2/2014 | Misono | G02F 1/1339 349/153 |
| 2014/0085579 | A1* | 3/2014 | Fan | G02F 1/1339 349/123 |

FOREIGN PATENT DOCUMENTS

| | | |
|---|---|---|
| JP | 2008-275894 A | 11/2008 |
| TW | 373110 B | 11/1999 |
| TW | M273740 | 8/2005 |
| TW | 201117074 A1 | 5/2011 |

OTHER PUBLICATIONS

State Intellectual Property Office of the People's Republic of China, "Office Action", issued on Mar. 17, 2017.

\* cited by examiner

DISPLAY DEVICE AND MANUFACTURING METHOD THEREOF

CROSS-REFERENCE TO RELATED APPLICATIONS

This non-provisional application claims priority under 35 U.S.C. §119(a) on Patent Application No(s). 104121735 filed in Taiwan, R.O.C. on Jul. 3, 2015, the entire contents of which are hereby incorporated by reference.

TECHNICAL FIELD

The disclosure relates to a display device and a manufacturing method thereof, more particularly to a liquid crystal display device and a manufacturing method thereof.

BACKGROUND

A conventional display device, as shown in FIG. 9, includes pixels PX, a source driver 910, a gate driver 920, a plurality of gate lines 922, and a plurality of data lines 912. The source driver 910 is electrically coupled to the data lines 912, and the gate driver 920 is electrically coupled to the gate lines 922. Each gate lines 922 and each data lines 912 are electrically coupled to a corresponding pixel PX. The source driver 910 provides a display signal to each pixel PX through the corresponding data line 912, and the gate driver 920 provides a gate signal to each pixel PX through the corresponding gate line 922. Therefore, each pixel PX can be reset and then receive the corresponding display signal from the data line 912.

As shown in FIG. 10, a typical pixel like the above pixel PX includes a transistor TFT and a liquid crystal capacitor CLC. An end of the transistor TFT is electrically coupled to the data line 912, another end of the transistor TFT is electrically coupled to the liquid crystal capacitor CLC, and the other end of the transistor TFT, i.e. the gate electrode, is electrically coupled to the gate line 922. The gate line 922 supplies pulses in order to switch on the transistor TFT, and thus, the display signal on the data line 912 can be written into or charge the liquid crystal capacitor CLC. As a result, the liquid crystal capacitor CLC can control the operation of the liquid crystal molecules corresponding to the pixel PX according to the display signal.

A liquid crystal display device requires high reliability in its technical progression as well as the advantage of cost and yield in its manufacturing. In other words, if the manufacturing technique to accomplish a liquid crystal display device is complicated and cannot provide a higher yield and a higher operational reliability, the products using such a manufacturing technique will lose a competitive advantage.

SUMMARY

According to one or more embodiments, the disclosure provides a display device. In one embodiment, the display device includes a first substrate, a second substrate, a liquid crystal layer, a backlight source, a integrated driving circuit, and a conductive portion. The liquid crystal layer is between the first substrate and the second substrate. The backlight source is at a first side of the second substrate. The integrated driving circuit is at a second side of the second substrate opposite to the first side of the second substrate. The conductive portion passes through the second substrate and is electrically coupled to the integrated driving circuit and the backlight source.

In one embodiment, the display device further includes a flexible circuit board electrically coupling the conductive portion. The conductive portion passes through the second substrate, and then the conductive portion is electrically coupled to the backlight source through the flexible circuit board.

In one embodiment, the display device further includes a plurality of transistors, which is disposed between the first substrate and the second substrate and controls the liquid crystal layer. The integrated driving circuit includes a first bump and a second bump. The first bump is electrically coupled to the transistors and sends signals provided by the transistors. The second bump is electrically coupled to the conductive portion and provides the backlight source with a brightness control signal.

In one embodiment, the second substrate is a glass substrate.

In one embodiment, the display device further includes a first fan out that is disposed at the first side of the second substrate and electrically couples the conductive portion to the flexible circuit board.

In one embodiment, the display device further includes a second fan out that is disposed at the second side of the second substrate and electrically couples the above first bump to the transistors.

In one embodiment, the backlight source receives power through the conductive portion.

In one embodiment, the integrated driving circuit covers the conductive portion.

In one embodiment, a majority of the first fan out is in an orthographic projection of the integrated driving circuit formed on the second substrate.

In view of the one or more above embodiments, the conductive portion in the display device passes through the substrate and couples to the integrated driving circuit at one side of the substrate and a light emitting source at the other side of the substrate, thereby simplifying the connection of the inner elements of the display device.

The display device employs a conductive portion, passing through the substrate, to couple together a driving integrated circuit and a light source disposed at two sides of the substrate, so as to simplify the conventional complex way of coupling these components together.

According to one or more embodiments, the disclosure provides a manufacturing method of a display device. In one embodiment, the manufacturing method includes the following steps. Provide a first substrate and a second substrate between which there is a liquid crystal layer. Form a conductive portion that is on the second substrate and passes through the second substrate. Electrically couple a flexible circuit board to the conductive portion at a side of the second substrate far from the first substrate. Cut an edge of the first substrate before or after the flexible circuit board is electrically coupled to the conductive portion. Dispose an integrated driving circuit at a side of the second substrate facing the first substrate and electrically couple the integrated driving circuit to the flexible circuit board through the conductive portion after the edge of the first substrate is cut.

In one embodiment, the manufacturing method further includes electrically coupling to the flexible circuit board to the backlight source.

In one embodiment, to form the conductive portion, which is disposed on and passes through the second substrate, is to form the conductive portion passing through the second substrate which is glass.

During the manufacture of the display device, there is no integrated circuit disposed on a surface of a substrate far from an opposite substrate to be cut, this surface remains relatively flat, thereby lowering the damage to the substrate caused by cutting stresses.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
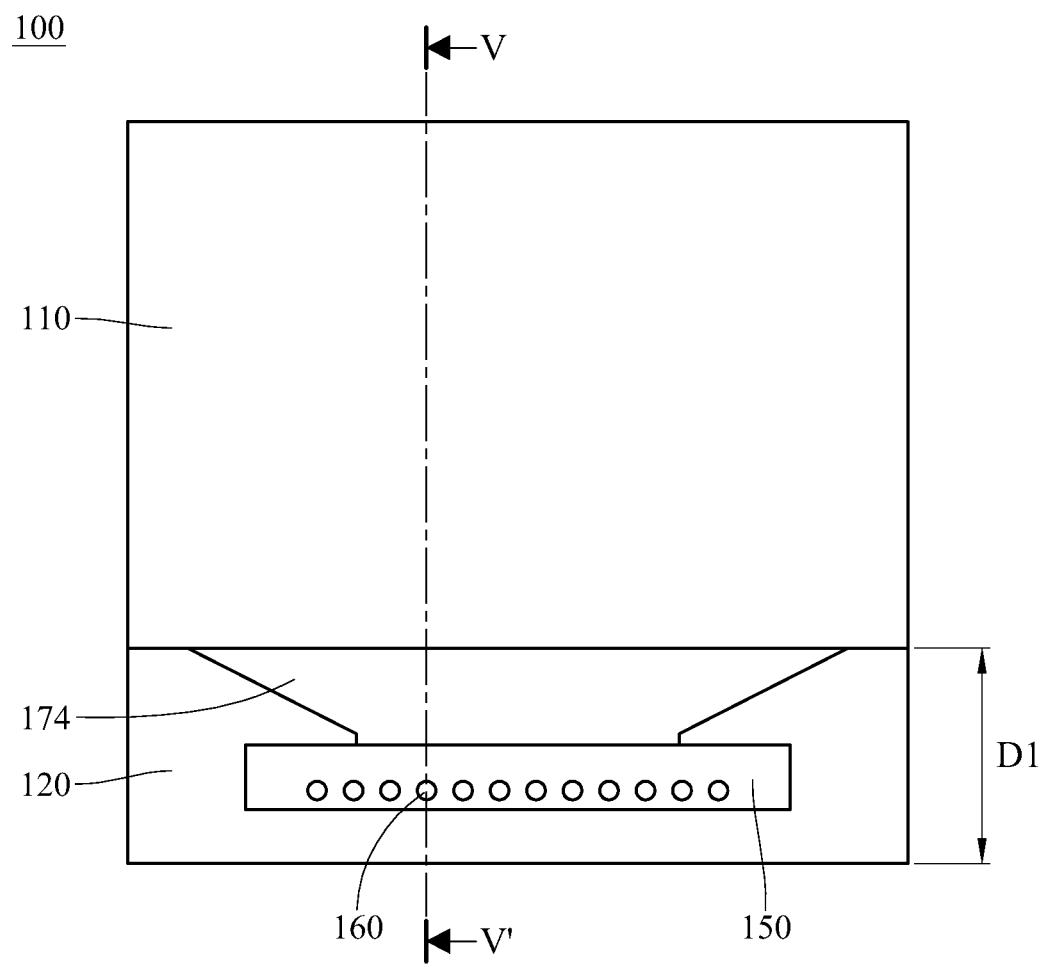
FIG. 1 is a front elevation of a display device in an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Moreover, the same thing may have more than one explanation, that is, one or all of the various explanations can be used to describe it. Therefore, one or more exchangeable words and synonyms are used to construct one or more terms. No matter if this term is illustrated or described wonderfully, the usage of exchangeable words and synonyms has no specific intension. The disclosure uses one or more synonyms of one or more certain terms. One or more common synonyms may be able to be replaced by other synonyms. Examples including any example of a term in the disclosure are merely used to illustrate the disclosure rather than to limit the scope of the disclosure, and neither do embodiments in the disclosure.

The terms like "connection", "connected to", "electrically coupled to", "connecting", "connect", "connect to", "couple", "coupling", "coupled", "coupled to" and "coupled with" are used to mean "in direct connection with" or "in connection with via one or more elements".

In the following descriptions related to signal transmission or provision, a signal to be transmitted at the transmission terminal and a transmitted signal at the receiving terminal will not lose the correspondence relationship therebetween even if decay or distortion may occur to them during the signal transmission.

When an element is disposed on/over another element, it means either that this element not only is on but also directly contacts another element, or that this element not only is on but also indirectly contacts another element (that is, there is something sandwiched in between the two elements). Also, when an element is disposed on and directly contacts another element, it means that there is nothing sandwiched in between the two elements.

The term "and/or" is used to describe the coverage of one or more present items or their combination.

The terms like "first", "second" and "third" are employed to describe various elements, components, regions, layers, and/or portions in order to merely distinguish one element, component, region, layer, and/or portion from another one rather than to limit them. Therefore, the elements, components, regions, layers, and/or portions in the disclosure respectively name first and second elements, components, regions, layers and/or portions without deviating from the spirit of the disclosure.

The terms appearing in the disclosure merely illustrate one or more embodiments of the disclosure rather than limit the disclosure. In an example, articles "a" and "the" are used to describe the singular as well as the plural unless otherwise stated. In another example, the term "include" or "comprise" or "has" or the like are used to describe the existence of one or more features, areas, regions, the whole, steps, operations, elements, and/or components and do not exclude the existence or addition of one or more extra other features, areas, regions, the whole, steps, operations, elements, and/or components.

The terms "up" and "down", "upper" and "lower", "above" and "below"; and other like terms indicating relative positions above or below a given point or element are used in this description to more clearly describe some embodiments. However, when applied to equipment and methods for use in environments that are deviated or horizontal, such terms may refer to a left to right, right to left, or other relationships as appropriate. The relative terminology like the terms "lower" or "bottom" or "under" or "below", "upper" or "top" or "over" or "above", and "left" or "right" appearing in the disclosure is employed to describe the relationship of two elements shown in a drawing. Besides of describing the orientation relationship shown presented in the drawing, such a relative terminology also indicates an opposite orientation of an element or a given point. For example, if the drawing is rotated by 180°, an element, which is under another element in the original description, will become above another element. That is, the exemplary term "under" may indicate a relative position above and below a given point or element shown in the drawing.

Unless otherwise stated, all terms including technical and scientific terms have the same or similar meanings the person of the ordinary skill in the art can realize. Also, terms defined by general dictionaries should be realized as consistent meanings in the relative art and the disclosure rather than as idealized or formalized meanings unless otherwise stated.

The term like "about", "substantially" or "most" in the disclosure represents a certain value or range with a permissible error of 20 percent, preferably 10 percent, or more preferably 5 percent. Hereinafter, all values/amounts appearing in the disclosure are approximations and described by the terms like "about", "substantially" or "most" if there is not a further definition provided.

Figure 2:
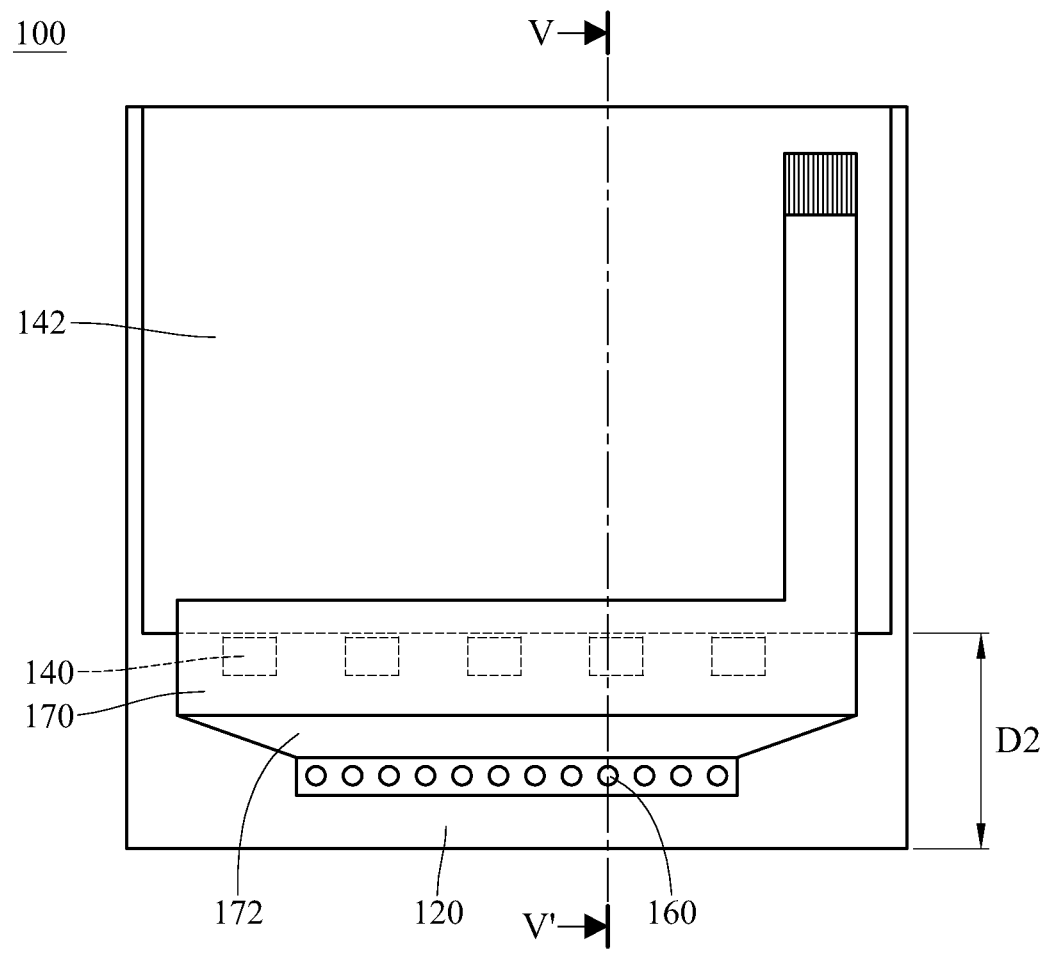
FIG. 2 is a dorsal view of the display device in an embodiment.
Figure 3:
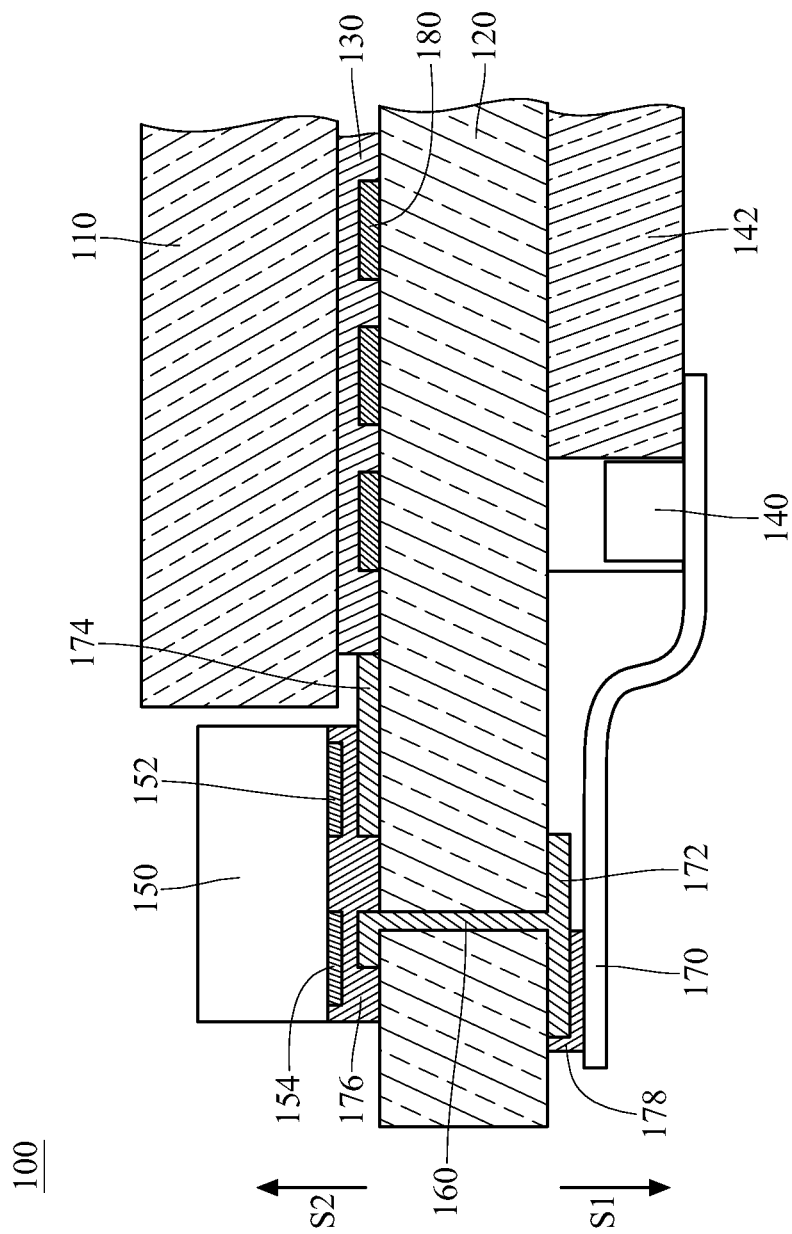
FIG. 3 is a cross-sectional view of the display device along a cross-sectional line V-V' in an embodiment.

Please refer to FIG. 1, which is a front elevation of a display device 100 in an embodiment, FIG. 2, which is a dorsal view of the display device 100 in an embodiment, and FIG. 3, which is a cross-sectional view of the display device 100 along a cross-sectional line V-V' in an embodiment.

The display device 100 includes a first substrate 110, a second substrate 120, a liquid crystal layer 130, a backlight source 140, an integrated driving circuit (IC) 150, and a conductive portion 160. The liquid crystal layer 130 is disposed between the first substrate 110 and the second substrate 120. The backlight source 140 is disposed at a first side S1 of the second substrate 120. The integrated driving circuit 150 is disposed at a second side S2 of the second substrate 120. The second side S2 of the second substrate 120 is opposite to the first side S1 of the second substrate 120. The conductive portion 160 passes through the second substrate 120 and is electrically coupled to the integrated driving circuit 150 and the backlight source 140.

Optionally, the display device 100 further includes a flexible circuit board 170, a plurality of transistors 180, a first fan out 172, a second fan out 174, a first conductive film 176, a second conductive film 178, and/or a light guiding plate 142. The integrated driving circuit 150 includes a first bump 152 and a second bump 154, in an example. As shown in FIGS. 1 and 2, the amount of the conductive portion 160 and the amount of the backlight source 140 are plural. These conductive portions 160 are sequentially arranged between the integrated driving circuit 150 and the second substrate 120.

For example, the material of the first substrate 110 and the material of the second substrate 120 are a glass, metal or macromolecular material, but not limited to the mentioned materials. The space between the first substrate 110 and the second substrate 120 is filled with the liquid crystal layer 130. The liquid crystal layer 130 can change the polarization of light emitted by the backlight source 140, so as to control the gray values of pixels of the display device 100. The liquid crystal layer 130 can be fulfilled by a variety of liquid crystal materials. The transistors 180 are disposed between the first substrate 110 and the second substrate 120. In an example, the transistors 180 are disposed between the liquid crystal layer 130 and the second substrate 120. The transistors 180 control the switching on/off of pixels of the display device 100, so as to conntrol refreshing of the pixels of the display device 100.

The integrated driving circuit 150 is, for example, but not limited to a gate driver, a source driver, a backlight driving circuit, a combination thereof or the like. The integrated driving circuit 150 includes a first bump 152 and a second bump 154. The two bumps respectively output a different control signal generated by the integrated driving circuit 150. In an example, the first bump 152 outputs a data signal or a gate signal to the transistor 180. The data signal indicates the gray value each pixel should display by, and the gate signal indicates when the transistor 180 should be switched on or off. When the transistor 180 is switched on, the data signal can be written into (or charge into) a pixel capacitor of a pixel corresponding to the switched-on transistor 180 and this pixel capacitor can control the rotation of the liquid crystal molecules corresponding to this pixel. Specifically, the second fan out 174 electrically couples the first bump 152 to the transistor 180 so these signals are transmitted to the transistor 180 through the second fan out 174 disposed at the second side S2 of the second substrate 120. The second bump 154 outputs a brightness control signal to the backlight source. The brightness control signal indicates how bright the light emitted by the backlight source should be. In other words, the brightness of the light, emitted by the backlight source, changes with the brightness control signal.

The first conductive film 176 electrically couples the second bump 154 to the conductive portion 160 and couples the first bump 152 to the second fan out 174. In an example, the first conductive film 176 is made of an anisotropic material. In an example, this anisotropic material is made of a binding agent and conducting particles therein. The first conductive film 176 is filled into the space between the second bump 154 and the conductive portion 160 and the space between the first bump 152 and the second fan out 174. An anisotropic conductive film generally has a conducting direction that is substantially vertical to the second substrate 120, so the first conductive film 176 can electrically couple the second bump 154 to the conductive portion 160 and couple the first bump 152 to the second fan out 174 without electrically coupling the second bump 154 to the first bump 152.

Moreover, the brightness control signal is transmitted to the first side S1 of the second substrate 120 through the conductive portion 160. The first fan out 172 is disposed at the first side S1 of the second substrate 120 in order to receive the brightness control signal and provide the flexible circuit board 170 with the brightness control signal through the second conductive film 178. In order words, the first fan out 172 electrically couples the conductive portion 160 to the flexible circuit board 170. The second conductive film 178 is filled into the space between the first fan out 172 and the flexible circuit board 170. In an example, the second conductive film 178 is made of an anisotropic material, such as a mixture of a binding agent and conducting particles therein.

The light guiding plate 142 guides the light emitted by the backlight source 140 away from the backlight source 140. The backlight source 140 is totally or partially covered by the flexible circuit board 170, and the flexible circuit board 170 has conducting wires for transmitting various electric signals including the brightness control signal required by the backlight source in an embodiment. In another embodiment, one or more of the conducting wires of the flexible circuit board 170 further transmit power that sequentially propagates from the conductive portion 160, the first fan out 172 and the second conductive film 178, to the backlight source 140.

In an embodiment, as shown in FIG. 1, the integrated driving circuit 150 covers on the conductive portion 160, that is, the conductive portion 160 is in the orthographic projection of the integrated driving circuit 150 on the second substrate 120, and thus, the boundary of the display panel, where one or more peripheral circuits will be disposed, may be minimized. For example, the width D1 in FIG. 1 representing the distance between an edge of the first substrate 110 and a corresponding edge of the second substrate 120 (which is at the same side as this edge of the first substrate 110), is about 2205 um (micrometer). Similarly, the width D2 representing the distance between an edge of the light guiding plate 142 facing the conductive portion 160 and an edge of the second substrate 120 at the same side is about 2205 um in an embodiment, as shown in FIG. 2. The above widths D1 and D2 are exemplary, and thus, the disclosure will not be limited thereto.

In an embodiment, a part or all of the first fan out 172 is in the orthographic projection of the integrated driving circuit 150 formed on the second substrate 120, so as to reduce a width of a preserved periphery portion of the second substrate 120.

Figure 4:
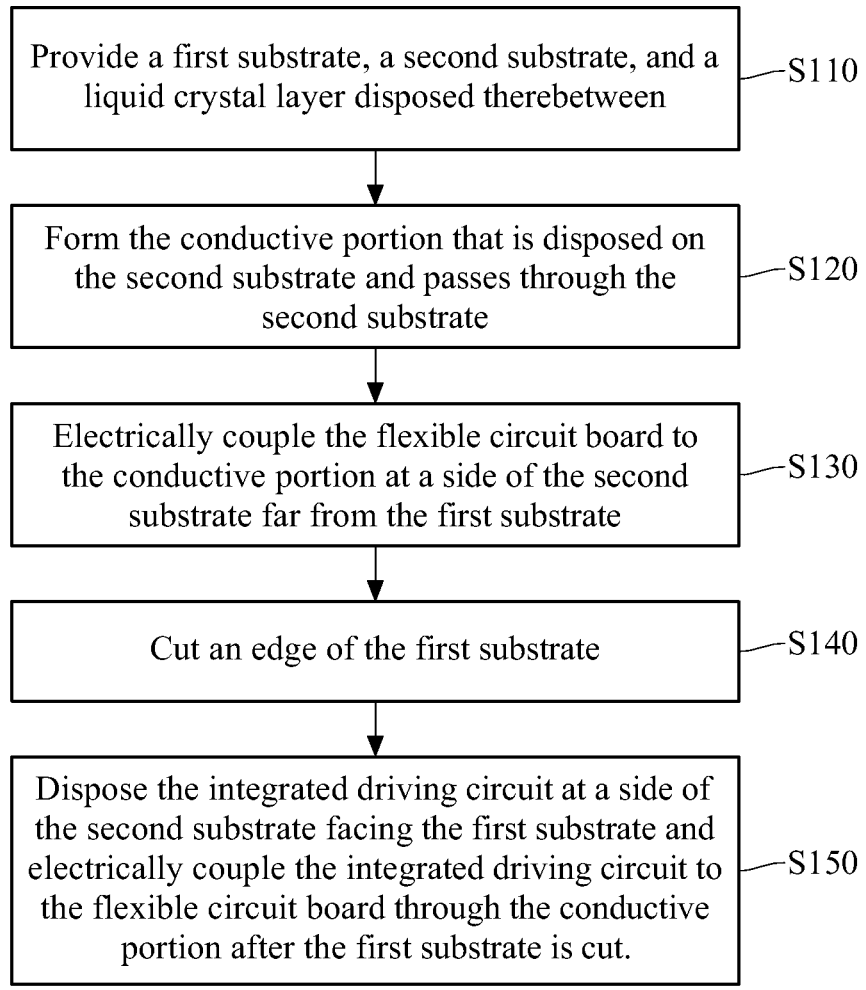
FIG. 4 is a flow chart of a manufacturing method of the display device in an embodiment.
Figure 5:
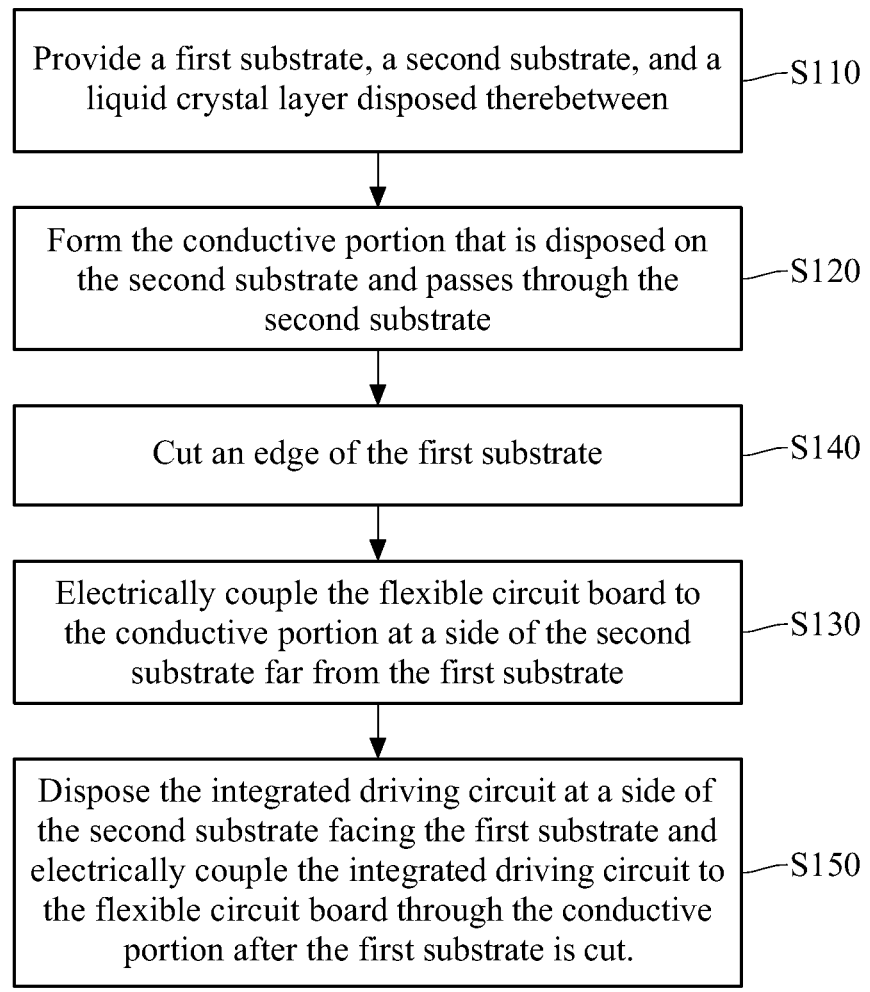
FIG. 5 is a flow chart of a manufacturing method of the display device in another embodiment.

Please refer to FIG. 4 and FIG. 5, illustrating a manufacturing method of the display device according to various embodiments. The manufacturing method is performed to produce the display device in the disclosure, but the disclosure will not be limited thereto. The manufacturing method includes the following steps:

S110: provide the first substrate 110, the second substrate 120, and the liquid crystal layer 130 disposed therebetween;

S120: form the conductive portion 160 that is disposed on the second substrate 120 and passes through the second substrate 120;

S130: electrically couple the flexible circuit board 170 to the conductive portion 160 at a side of the second substrate 120 far from the first substrate 110;

S140: cut an edge of the first substrate 110 after or before the flexible circuit board 170 is electrically coupled to the conductive portion 160; and S150: dispose the integrated driving circuit 150 at a side of the second substrate 120 facing the first substrate 110 and electrically couple the integrated driving circuit 150 to the flexible circuit board 170 through the conductive portion 160 after the edge of the first substrate 110 is cut.

The differences between the manufacturing methods shown in FIG. 4 and FIG. 5 are that the steps S140 and S130 are performed in different orders and the flexible circuit board 170 is electrically coupled to the backlight source 140 that has been assembled.

Figure 6A:
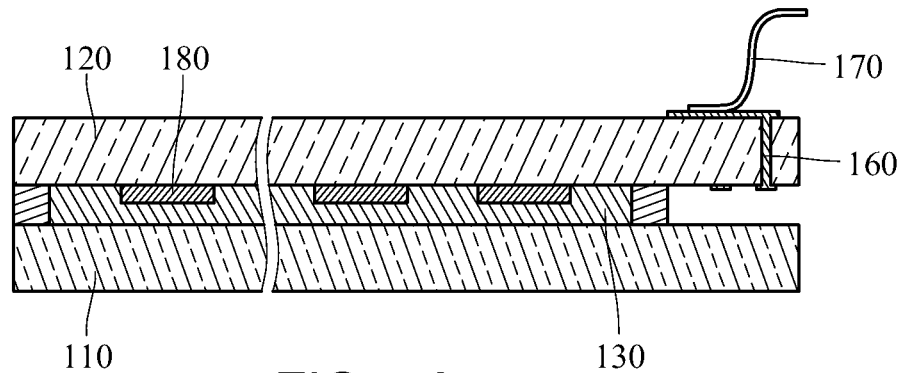
FIG. 6A to FIG. 6C illustrate the manufacturing method of the display device.
Figure 6B:
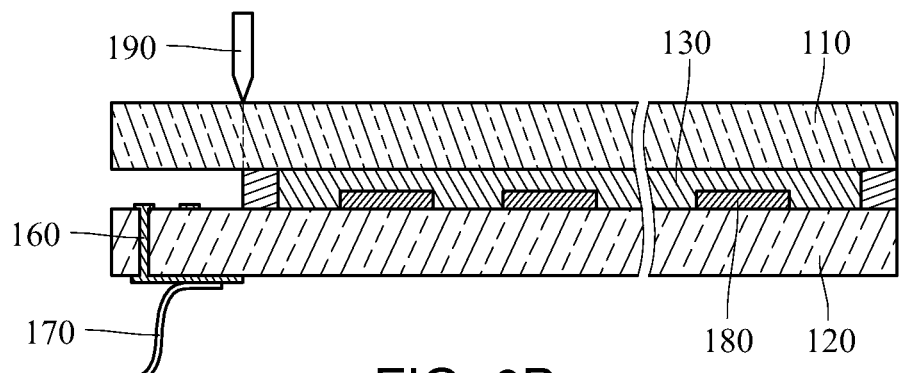
Figure 6C:
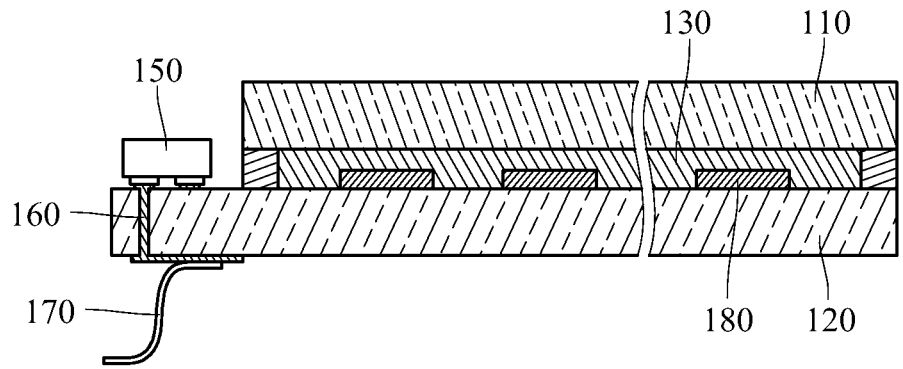

Please refer to FIG. 6A to FIG. 6C, which sequentially illustrate the manufacturing method of the display device. As shown in FIG. 6A, a combination of the first substrate 110, the liquid crystal layer 130 and the second substrate 120 are provided, where the liquid crystal layer 130 is disposed between the first substrate 110 and the second substrate 120. Also, a conductive material is filled into a through hole of the second substrate 120 to form the conductive portion 160 after the hole is drilled in the second substrate 120 by, for example, but not limited to, a glass drilling technology. Then, the flexible circuit board 170 is electrically coupled to the conductive portion 160 at a side of the second substrate 120 far from the first substrate 110. Specifically, the second conductive film 178 electrically couples the flexible circuit board 170 to the conductive portion 160.

During the cutting, the semifinished product of the display device 100, i.e. the components in FIG. 6B, is disposed on a working platform, and then the cutter 190 is used to cut one edge of the first substrate 110, usually from the side of the first substrate 110 closest to the flexible circuit board 170. Moreover, when the semifinished product is laid down on the working platform and there is a large-volume component (e.g. a packaged integrated circuit) disposed on a surface of the second substrate 120 that is far from the first substrate 120, this surface of the second substrate 120, far from the first substrate 110, will not fit in the plane of the working platform, leading to a large horizontal gap between the second substrate 120 and the working platform. Therefore, when the cutter 190 is cutting the first substrate 110, the formed stresses may break the first substrate 110 or the second substrate 120.

In practice, if the flexible circuit board 170 is disposed at the surface of the second substrate 120 far from the first substrate 110, because the flexible circuit board 170 has a smaller thickness and is flexible, the gap caused by the flexible circuit board 170 may be smaller as compared to the gap caused by the integrated circuit. This smaller gap may reduce a possibility of breaking one substrate during the cutting of another substrate. As shown in FIG. 6C, the cut first substrate 110 exposes a part of a surface of the second substrate 120 that is covered by the original first substrate 110; thus the integrated driving circuit 150 can be disposed at the exposed part of the surface of the second substrate 120 facing the first substrate 110. Then, the integrated driving circuit 150 is electrically coupled to the flexible circuit board 170 through the conductive portion 160.

Figure 7:
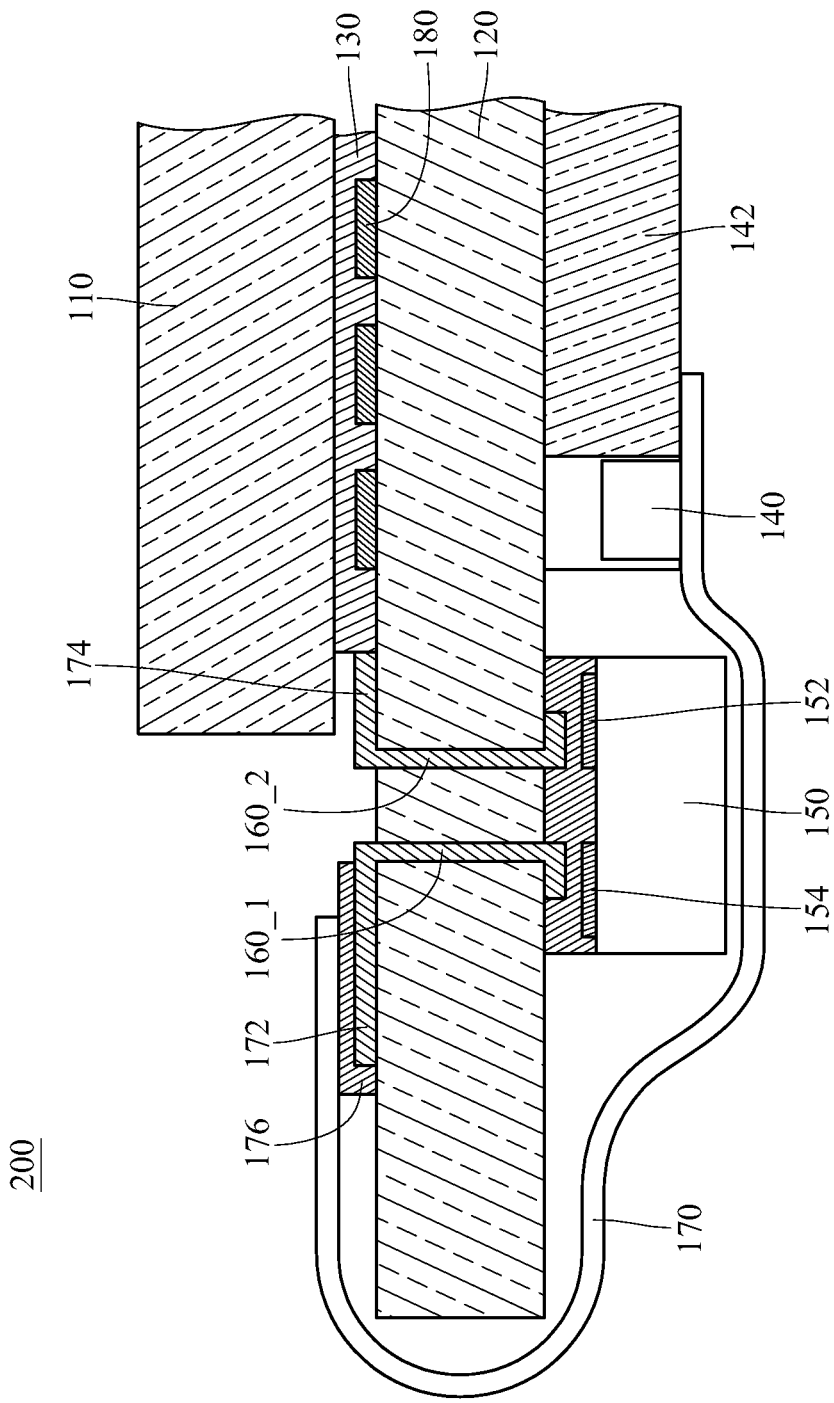
FIG. 7 is a cross-sectional view of the display device along a cross-sectional line V-V' in another embodiment.

Please refer to FIG. 7, which is a cross-sectional view of a display device 200 in another embodiment. Compared with the display device 100 in FIG. 3, the integrated driving circuit 150 in the display device 200 is disposed at a side of the second substrate 120 far from the first substrate 110. In other words, the integrated driving circuit 150 and the backlight source 140 are disposed at the same side of the second substrate 120, and the liquid crystal layer 130 and the integrated driving circuit 150 are respectively disposed at two opposite sides of the second substrate 120. Moreover, the integrated driving circuit 150 in FIG. 7 outputs signals including a data signal or a gate signal to the transistor 180 and/or a brightness control signal to the backlight source, and these signals are output to a side of the second substrate 120 facing the first substrate 110 through the conductive portions 160_1 and 160_2. The conductive portions 160_1 and 160_2 pass through the second substrate 120. In addition, the brightness control signal is sequentially transmitted through the first fan out 172, the first conductive film 176 and the flexible circuit board 170 to the backlight source 140 at a side of the second substrate 120 far from the first substrate 110 after the brightness control signal is transmitted to a side of the second substrate 120 facing the first substrate 110. The first fan out 172 and the first conductive film 176 are disposed at a side of the second substrate 120 facing the first substrate 110, and the flexible circuit board 170 stretches across the two opposite sides of the second substrate 120. Compared with the display device 200, the flexible circuit board 170 in FIG. 3 does not stretch across the second substrate 120 and is at a side of the second substrate 120 far from the first substrate 110. In other words, the flexible circuit board 170 in the display device 100 has a start terminal (i.e. the portion electrically coupled to the first fan out 172) and a tail terminal (i.e. the portion electrically coupled to the backlight source 140), and the two terminals both are at a side of the second substrate 120 far from the first substrate 110. In the display device 200, the signal propagates from one side of the second substrate 120 to another one through the flexible circuit board 170, and the backlight source 140 is at an inner side of the flexible circuit board 170, which is far from the second substrate 120 in relation to the integrated driving circuit 150. Therefore, the flexible circuit board 170 easily causes interferences with the second substrate 120 and the integrated driving circuit 150, and the structure may be more complicated.

In addition, to form a connection portion (i.e. the first fan out 172 and the first conductive film 176) capable of coupling to the flexible circuit board 170 in the display device 200, the first fan out 172 stretches out from the integrated driving circuit 150 and the first substrate 110 to form a convex portion, which is not covered by the orthographic projection of the integrated driving circuit 150 on the second substrate 120. In practice, a preserved width between an edge of the first substrate 110 facing the integrated driving circuit 150 and an edge of the second substrate 120 on the second substrate 120 is about 3610 um.

Figure 8A:
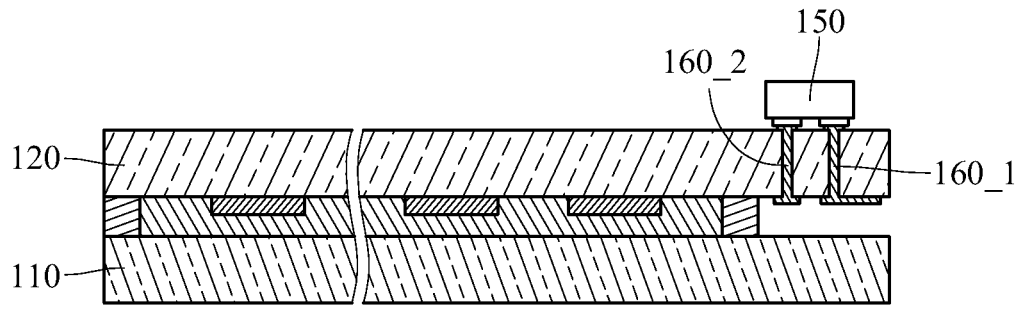
FIG. 8A to FIG. 8D illustrate the manufacturing method of the display device in another embodiment.
Figure 8B:
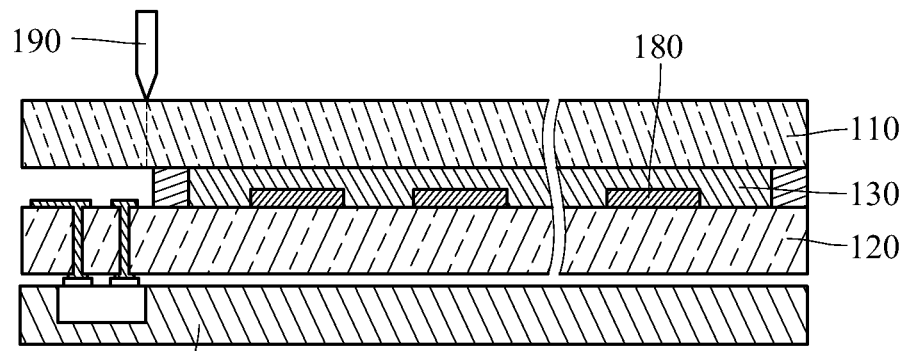
Figure 8C:
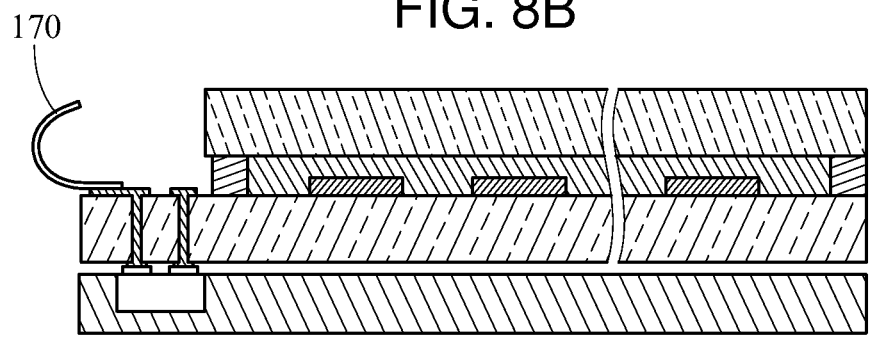
Figure 8D:
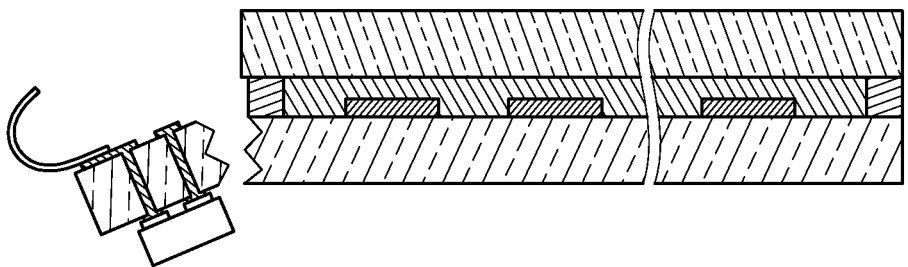
Figure 9:
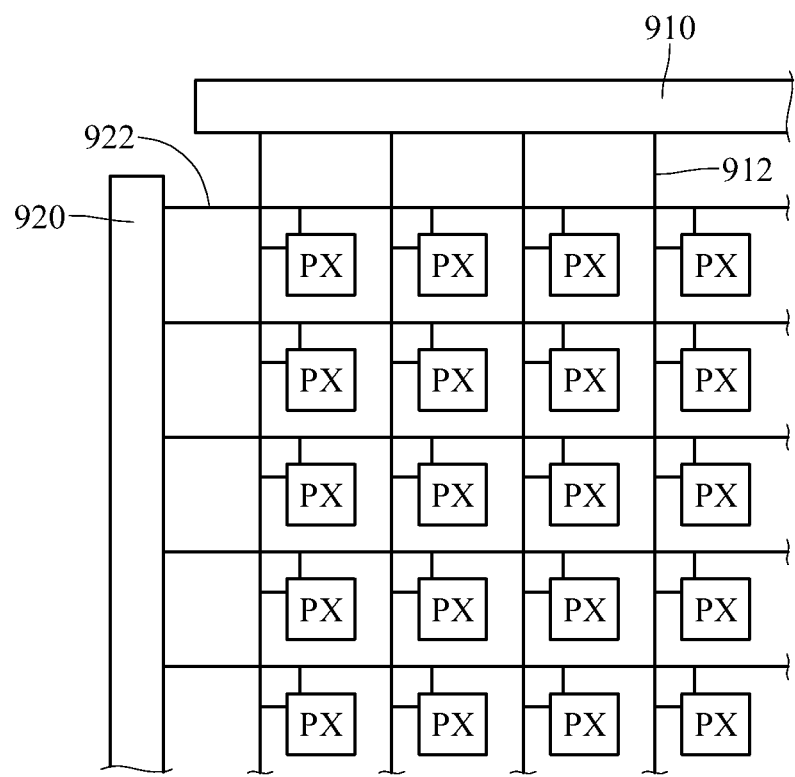
FIG. 9 is a system structure diagram of a conventional display device.
Figure 10:
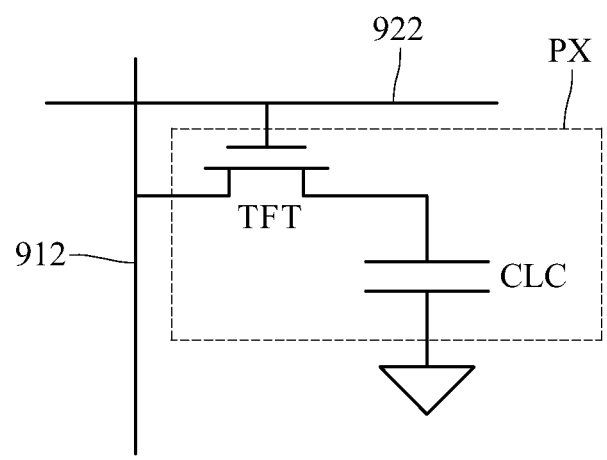
FIG. 10 is a schematic diagram of a pixel of the conventional display device.

Please refer to FIG. 8A to FIG. 8D, where the manufacturing method of the display device in another embodiment is illustrated. The manufacturing method sequentially illustrated in FIG. 8A to FIG. 8D is applied to the manufacturing of the above display device 200. The manufacturing method in FIG. 8A to FIG. 8D and the manufacturing method in FIG. 6A to FIG. 6C have some differences therebetween them as follows: bonding the integrated driving circuit 150 at a side of the second substrate 120 far from the first substrate 110 as shown in FIG. 8A before the first substrate 110 is cut by the cutter 190 as shown in FIG. 8B. In general, in order to cut the first substrate 110, the second substrate 120 at its one side far from the first substrate 110 needs to be laid on a platform. However, the integrated driving circuit 150 at the side of the second substrate 120 far from the first substrate 110 will cause a gap, which may lead in the fracture of the second substrate 120 as shown in FIG. 8D when the first substrate 110 is being cut without any remedy for the second substrate 120. Herein, a supporter 191 can be employed as the remedy. Therefore, a surface of this supporter 191 has a concave for accommodating the convex, e.g. the integrated driving circuit 150, at a side of the second substrate 120 far from the first substrate 110, and another surface of the supporter 191 is a plane surface for lying on or leaning against the platform.

In addition, the display device can employ the conductive portion passing through the substrate and is electrically coupled to the integrated driving circuit and the light emitting source, which are disposed at two sides of the substrate, respectively. This may simplify the conventional way to form the above elements in the display device.

What is claimed is:

1. A manufacturing method of a display device, comprising:

providing a first substrate, a second substrate, and a liquid crystal layer disposed therebetween;

forming a conductive portion which is disposed on and passes through the second substrate;

electrically coupling a flexible circuit board to the conductive portion at a side of the second substrate facing away the first substrate;

cutting the first substrate from an edge of the first substrate after the flexible circuit board is electrically coupled to the conductive portion; and disposing an integrated driving circuit at a side of the second substrate facing the first substrate and electrically coupling the integrated driving circuit to the flexible circuit board through the conductive portion after the edge of the first substrate is cut.

2. The manufacturing method according to claim 1, further comprising:

electrically coupling the flexible circuit board to a backlight source.

3. The manufacturing method according to claim 2, wherein forming the conductive portion which is disposed on and passes through the second substrate is to form the conductive portion passing through a glass material of the second substrate.

4. The manufacturing method according to claim 1, wherein forming the conductive portion which is disposed on and passes through the second substrate is to form the conductive portion passing through a glass material of the second substrate.

* * * * *